United States Patent [19]
McBride et al.

[11] Patent Number: 5,297,746
[45] Date of Patent: Mar. 29, 1994

[54] GRANULATOR KNIFE

[75] Inventors: Thomas D. McBride, Shrewsbury, Mass.; James L. Young, Cumberland, R.I.

[73] Assignee: Nelmor Company, Inc., North Uxbridge, Mass.

[21] Appl. No.: 998,462

[22] Filed: Dec. 30, 1992

Related U.S. Application Data

[63] Continuation-in-part of Ser. No. 831,620, Feb. 6, 1992, abandoned.

[51] Int. Cl.⁵ ............................................ B02C 19/18
[52] U.S. Cl. .................................. 241/242; 241/294
[58] Field of Search ............... 241/241, 242, 274, 294; 144/225, 230, 231, 241

[56] References Cited

U.S. PATENT DOCUMENTS

| | | | |
|---|---|---|---|
| 1,167,802 | 1/1916 | DeLaney. | |
| 3,749,325 | 7/1973 | Maier | 241/86 |
| 3,854,511 | 12/1974 | Maier | 144/230 |
| 3,981,337 | 9/1976 | Sundstrom | 144/241 |
| 4,009,837 | 3/1977 | Schnyder | 241/294 |
| 4,784,337 | 11/1988 | Nettles et al. | 241/92 |
| 4,887,772 | 12/1989 | Robinson et al. | 241/92 |
| 4,969,605 | 11/1990 | Morin | 241/192 |
| 5,060,875 | 10/1991 | McBride | 241/242 |
| 5,076,503 | 12/1991 | Cook | 144/230 |

FOREIGN PATENT DOCUMENTS

| | | |
|---|---|---|
| 2736612 | 2/1979 | Fed. Rep. of Germany. |
| 8120063 | 4/1983 | France. |
| 1253790 | 12/1983 | U.S.S.R. . |

Primary Examiner—Douglas D. Watts
Attorney, Agent, or Firm—Samules, Gauthier & Stevens

[57] ABSTRACT

A granulator which has a rotor knife seat having a plurality of tapped holes and a clamp to secure a knife to the rotor seat, is set forth. The granulator further includes a floor formed in the rotor seat and a trapezoidal shaped knife having a rear wall. The knife has an upper surface and a forward sloping surface, the sloping surface terminating at one end in a cutting edge and intersecting at its other end the upper surface and defining at said intersection a knife alignment edge. An adjustable clamp having a plurality of bolt holes is also provided. The clamp may be moved with reference to the rotor seat within the limits defined by the diameters of the bolt holes.

4 Claims, 3 Drawing Sheets

GRANULATOR KNIFE

CROSS-REFERENCE TO RELATED APPLICATION(S)

This application is a continuation-in-part application of U.S. Ser. No. 831,620 filed 6 Feb. 1992, now abandoned.

BACKGROUND OF THE INVENTION

A granulator is used to reduce the size of plastic or other materials to particles small enough to be used in reprocessing, disposal, etc. This size reduction is accomplished through the use of knives to cut the material into smaller pieces. A granulator has one or more stationary (bed) knives and two or more rotating (rotor) knives. When a rotor knife passes a stationary knife, a cutting action is produced, assuming that a piece of material is located between the knives. A half cylinder containing a large number of perforations (screen) is located directly below the knives to control the size of granulated particles leaving the cutting area. Particles are forced to remain in the cutting area until they are small enough to fall through the screen.

Granulators have been manufactured for over thirty years. The traditional approach to design has been to make the knife large enough to accommodate several round holes for the purpose of bolting the knife to its mating structures. Knives are currently manufactured from a solid piece of tool steel, which is usually "hardened" using a thermal heat treatment process. Once knives become dull, they are typically removed from the machine, resharpened, and installed back into the granulator. A typical knife can be resharpened about five times before it becomes too small to be effective and must be disposed of. When a knife is disposed of, it still contains approximately ninety percent of its original material.

A problem with conventional knives is that as they become dull, the quality of the granulated material suffers. Dulled knives tend to "beat" or "hammer" the material rather than cut it. As a result, the amount of dust or "fines" in the granulate increases. Users wish to reduce the amount of fines to a minimum, because the dust is objectionable from a housekeeping standpoint. It causes problems in material transfer systems, and usually results in waste.

If knives could remain sharp for a longer period of time, the costs associated with resharpening and changing the knives would be reduced. The quality of the granulated material would also be improved.

Extending the life of the cutting edge requires a more durable material; i.e., a material that wears better and is not brittle. Such materials do exist. The real problem arises when one attempts to use these exotic materials in a conventional knife configuration. The cost per pound of these materials is significantly higher than conventional tool steels, and this approach is just not economically attractive.

Over the years there have been many attempts to improve the life of granulator knife cutting edges. The development of better tool steels has caused some increases in knife life, but at a higher cost. For instance, some standard granulator knives are manufactured from chrome-vanadium-steel (CVS). Better life can be obtained from a knife made from hardened D-2 tool steel, but the cost is about 40 percent higher. Still greater life can be achieved by treating a knife surface with a flame sprayed tungsten or titanium carbide coating. Knife life can triple, compared to that of a CVS knife, but not without a substantial increase in cost.

Other coatings on conventional knives have been tried with the goal of improving edge life. Titanium nitride coatings, which have dramatically improved the life of such things as drill bits, have been tried. Although some improvement was achieved, the economics are not attractive.

Strips of tungsten carbide have been secured to mild steel knife bodies. The tungsten carbide is very hard and would enhance the wear characteristics, while the majority of the knife is made from lower cost mild steel. Although this approach has been tried, the difficulties in joining the two metals made this a very expensive process, and therefore not a good solution to the knife wear problem. In a similar fashion, D-2 tool steel strips were attached to mild steel bodies. The approach also did not prove to be reliable or economical.

A more modern approach is to metallurgically bond (using the hot isostatic press approach (HIP)) a small amount of a hardenable ceramic composite to a conventional tool steel body in an attempt to achieve an economical solution to knife wear. The ceramic composites typically consist of tungsten or titanium carbide particles suspended in a tool steel matrix. The product is machinable before heat treatment, after which it requires grinding. The cost of this process appears to be very high and its economics are questionable.

Another approach tried was to apply a cladding to the knife tip area on a mild steel knife base. After the very hard weld deposited material was applied, the final knife cutting edge had to be machined through an electrical discharge machining (EDM) process. The economics of this approach did not prove to be acceptable.

A small reversible, and expendable knife Turn-knife TM is available. Its complex shape is produced by extrusion from a high durability proprietary steel, and the final critical features are produced by grinding. This knife is positioned and retained to its mounting surface by a clamp. The knife requires complex and precise features on both its mounting surface and its clamp. In addition, the knife cannot cut thick parts because of its small protrusion from the rotor.

My U.S. Pat. No. 5,097,790 teaches a reversible, trapezoidal shaped knife which is miniature in size and is held in place by a bolted clamp. This knife has many advantages over conventional knives but is limited to cutting parts which have light to medium cross-sections. Being reversible and precisely located on the rotor by two pins, the protrusion of this knife from the front edge of the rotor has a practical limit. Because this amount of protrusion affects its ability to cut through the material, this knife is not a good choice for cutting parts with very thick cross-sections, such as from ⅜" to 1½" for many materials.

To solve this problem, as disclosed in the parent application, a clamp-knife design was developed which used only 'exotic material' and was capable of cutting parts as thick as with conventional knives, such as up to 1½" for many materials and shapes. The knife used only about 12% of the materials of conventional knives.

The knife was designed to be resharpened at least three times. The rear face of the knife was butted up against a ledge, which ledge was formed either in the clamp or the rotor seat. This ledge was fixed. When a new knife was placed in the seat and clamped into position, it extended its maximum unsupported distance from the clamp and seat. This clamp-knife design was not designed for use in abusive conditions. That is, if the granulator were designed for granulating plastic material, such as scrap plastic from a molding machine and used in-house, the knife would only expect to cut plastic. However, it was found in actual use even where a granulator was used in-house where only scrap plastic should be encountered, metal parts such as bolts, would find their way into the granulator and the knife, because of its extension from the clamp and seat, would tend to break.

Broadly, the present invention embodies a rotor seat-knife-adjustable clamp design which overcomes the breaking of the knife in abusive conditions and which allows the knife to be resharpened and precisely repositioned on the average at least three times. Further, the knife is smaller than conventional knives and uses only about 12% of the material used in conventional knives for the same purpose.

The knife is trapezoidal in cross-section and includes a rear wall, an upper surface and a sloped surface which terminates in a cutting edge. Where the upper surface and sloped surface intersect they define a knife alignment edge.

The rotor seat has a floor and rear wall formed therein. The knife is seated on the floor with its rear edge butted up against the rear wall. The rotor seat is also characterized by tapped holes.

The clamp includes a plurality of holes. The wall defining each hole is characterized by a stepped surface which defines a first upper hole of a diameter greater than the bolt head which will pass therethrough and a second narrower lower hole of a diameter greater than the shaft of the bolt which passes therethrough. The clamp is further characterized by a rear wall and a forward portion, the forward portion having a sloped upper surface, and a flat bottom surface which intersect at a clamp alignment edge.

The enlarged holes in the clamp allow the clamp position to be adjusted each time a knife is seated. When a knife is seated it engages the rear wall of the rotor seat. The location of the rear wall is constant or fixed. A gauge is used to position the clamp with reference to the knife edge, which is immovable, and the rear wall of the clamp, which is moveable. The gauge, which is a single U-shaped piece, locates the clamp with reference to the knife such that the sloped surface of the knife and the sloped upper surface of the adjustable clamp lie in substantially the same plane and the knife alignment edge and clamp alignment edge are adjacent to one another. This ensures that the knife receives maximum support from the clamp.

Once a cutting edge becomes dull,, the knife is removed and resharpened. The resharpened knife is then placed on the floor of the rotor seat with the rear wall of the knife butted up to the rear wall of the rotor seat. Dimensionally the knife is smaller with reference to the distance between its rear wall and the cutting edge. Again, the gauge is used, typically one gauge at each end of the knife, and the clamp is moved until it is properly positioned such that the knife alignment edge and clamp alignment edge are adjacent to one another. That is, the clamp is now properly aligned with reference to the new size of the knife to provide maximum support to the knife. It is important to advance the clamp sufficiently toward the edge of the knife to provide maximum support, but not too far forward such that it would interfere with (hit) the stationary (bed) knife. Once the knife is properly positioned then the bolts are secured.

The knife and clamping arrangements described herein dramatically improve the economics of attaining longer lasting knife edges, reduce machine downtime and labor costs due to less frequent changes, an improves granulate quality by minimizing fines.

BRIEF DESCRIPTION OF THE DRAWING(S)

DESCRIPTION OF THE PREFERRED EMBODIMENT(S)

Figure 1:
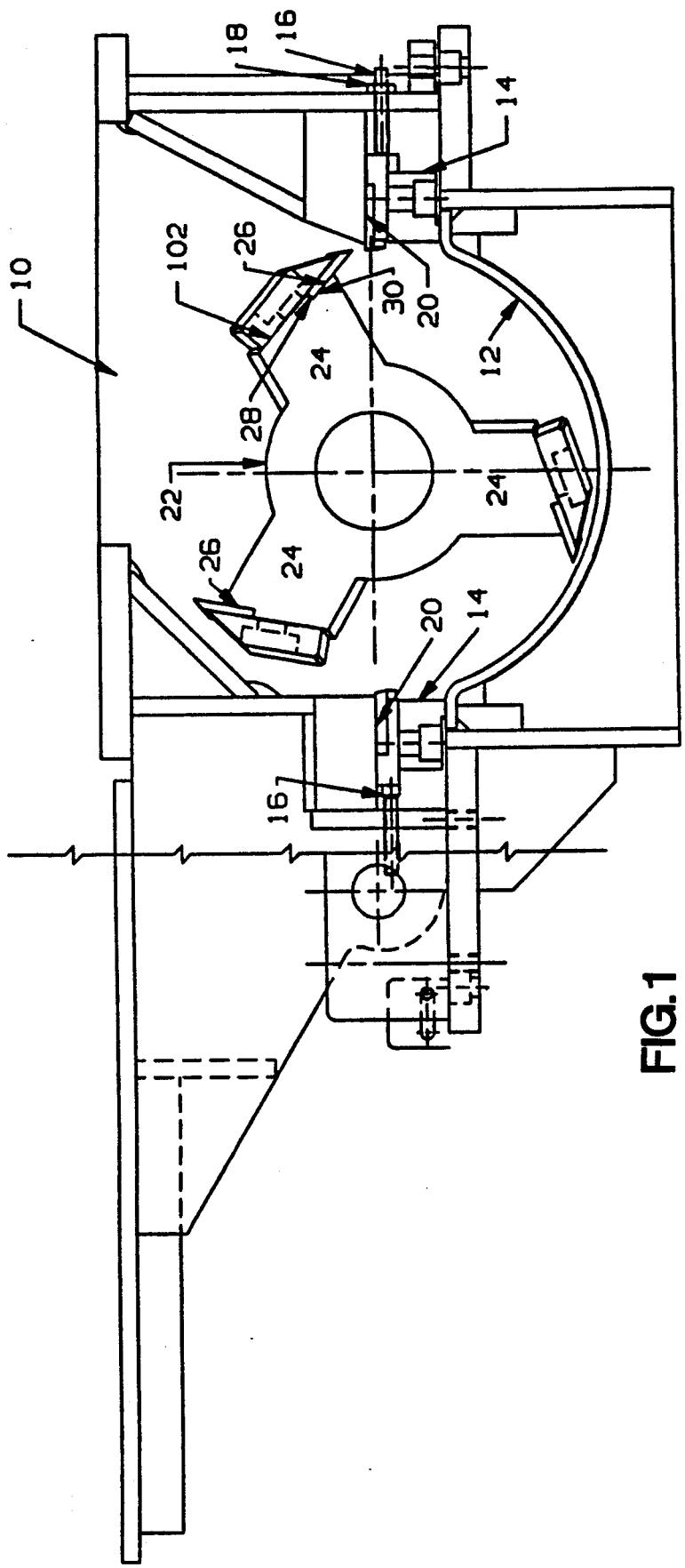
FIG. 1 is a side schematic view of a granulator embodying the invention.

Referring to FIG. 1, a granulator is shown generally at 10 and comprises a screen 12, bed knife clamps 14, each with an adjustable screw 16 and chuck nut 18. The bed knife assembly includes a seat 20.

Received in the granulator is a rotor 22 having arms 24. Each of the arms includes rotor seats 26 and rotor ledges 102. Although the rotor in the preferred embodiment is shown with three arms, it may have two arms or more than three. The rotor seats each include a rear wall 28 and a floor 30.

Figure 2:
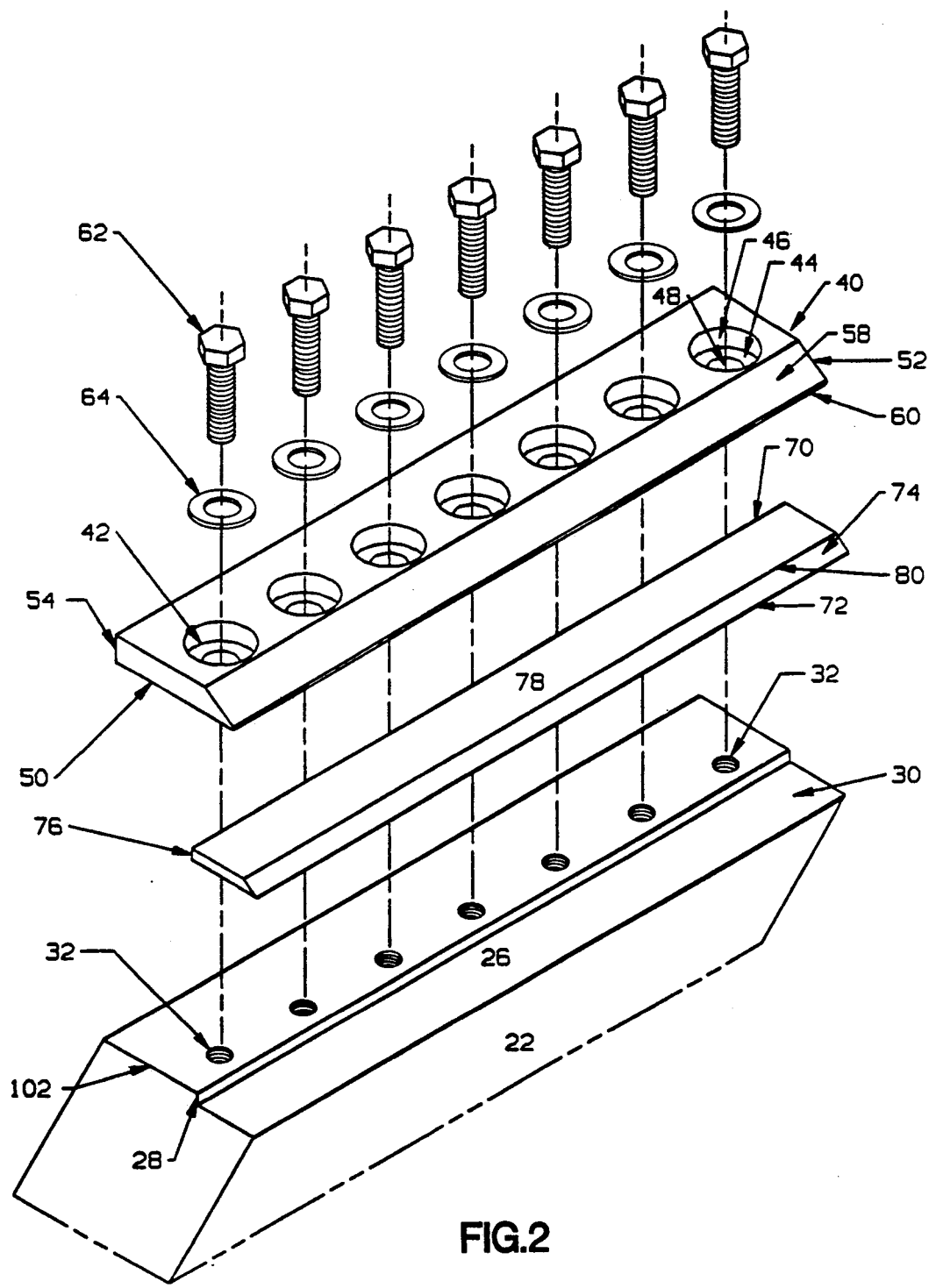
FIG. 2 is an exploded perspective view of the rotor seat, knife and adjustable clamp disassembled.

Referring to FIG. 2, the rotor ledge 102 has a plurality of tapped holes 32.

A clamp 40 has a plurality of holes 42 which are in register with the holes 32 when the clamp is bolted to the rotor ledge 102. The holes 42 are characterized by a stepped surface 44 which defines an upper larger hole 46 and a lower smaller hole 48. The clamp further comprises a rearward portion 54, a forward portion 52 and a bottom portion 50. The holes 42 are formed in the bottom portion 50. The forward portion comprises a sloped upper surface 58, which intersects at a clamp alignment edge 60. Bolts 62 secure the clamp 40 to the rotor ledge 102 thereby holding the knife securely against the seat 26. The bolts 62 have washers 64 associated therewith.

A rotor knife 70, made from materials such as a CPM-10V and trapezoidal in shape, includes a forward cutting edge 72, a sloped surface 74, a rear wall 76 and an upper surface 78. The surfaces 74 and 78 intersect at a knife alignment edge 80. When assembled, the rear wall 76 abuts the rear wall 28.

Figure 3:
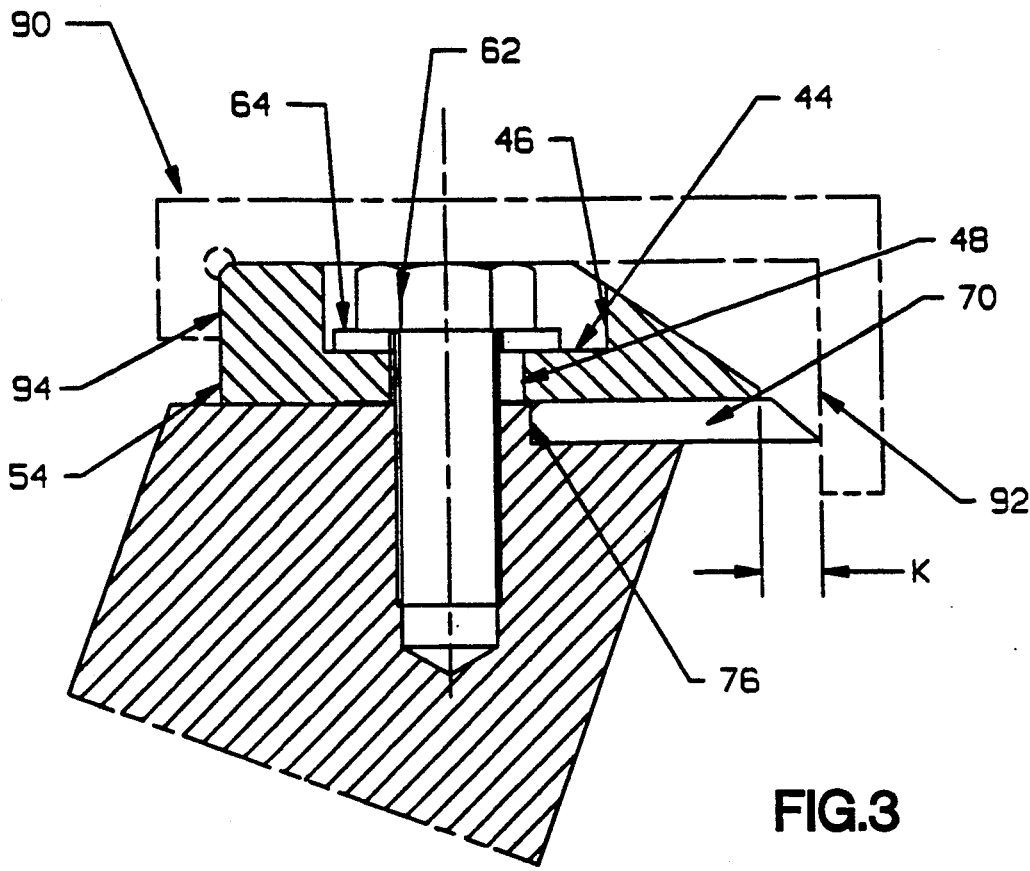
FIG. 3 is a side schematic view of a new knife locked into position.

Referring to FIG. 3, a new knife 70 is placed in the rotor seat with its rear wall 76 butted up to the wall 28 of the rotor seat. The bolts 62 pass through the clamp 40 and movably secure the clamp to the rotor seat and simultaneously secure the knife 70 to the seat 26. Gauges 90 (only one shown) each comprise a front stop 92 and a back stop 94. The front stops 92 of the gauges 90 engage the cutting edge at the ends of the knife 70. The back stops 94 are spaced apart from the rear wall 54 of the clamp 40. Force is applied manually to the clamp 40 to move it rearwardly until it engages the back stops 94. The applied force is then transmitted through the clamp 40 to the rotor knife 70, thereby positioning it securely against the rear wall 28. When engaged, the bolts 62 are secured, locking the clamp 40 and knife 70 to the rotor arm 24. In the locked position, the sloping surface 58 of the clamp 40 lies in a plane substantially coincident with the plane of the surface 74 of the knife 70. The clamp alignment edge 60 is adjacent the knife alignment edge 80. The gauges 90 ensure that this relationship is obtained and maximum support is provided for the knife.

Figure 4:
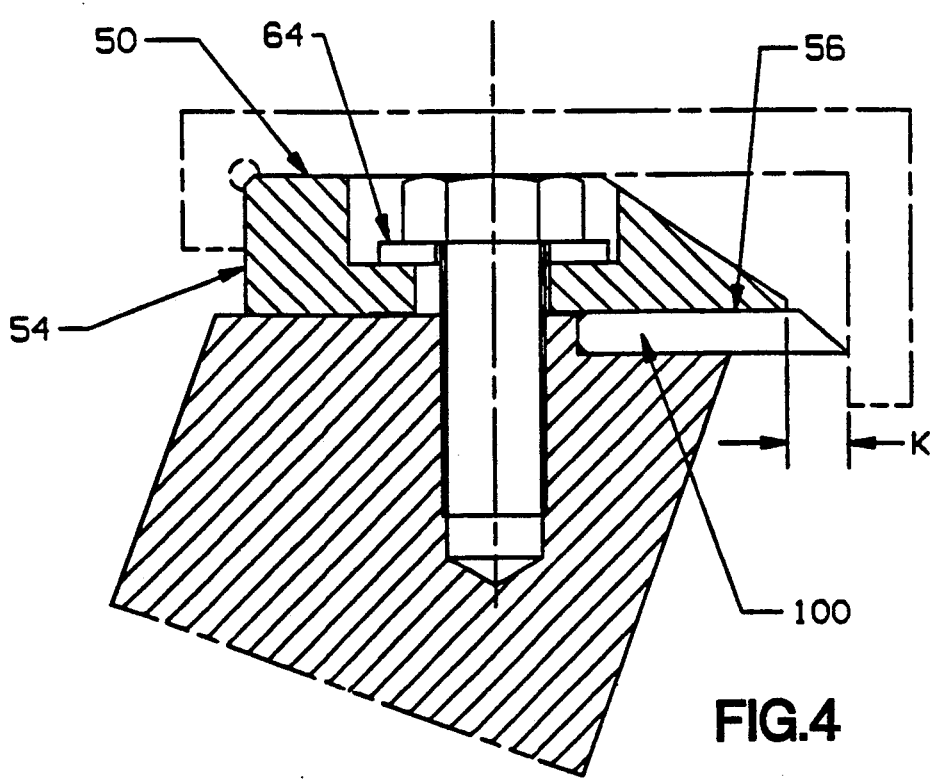
FIG. 4 is a side schematic of a resharpened knife in position with the clamp positioned by gauges at either end.

Referring to FIG. 4, when the knife is resharpened and replaced, the clamp 40 is loosened. The resharpened rotor knife 100 has a different dimension than the knife 70. The gauges 90 are used to reposition the clamp to ensure that the proper relationship is maintained between the clamp 40 and the knife 100.

Comparing FIGS. 4 and 3, in FIG. 4, the clamp 40 is positioned more inwardly (to the left as shown in the drawings) than in FIG. 3. The diameters of the holes 46 and 48 accommodate this change in position. However, the relationship of the alignment edges does not change because the gauges ensure this relationship remains constant.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described my invention, what we now claim is:

1. A granulator which has a rotor knife seat having a plurality of tapped holes and a clamp to secure a knife to the rotor seat, which comprises:
    a floor formed in the rotor seat, the floor extending from the outer surface of the rotor inwardly and terminating in a fixed rear wall;
    a trapezoidal shaped knife having a rear wall, the knife seated on the floor of the rotor seat, the rear wall of the knife butted to the rear wall of the rotor seat, the knife including an upper surface and a forward sloping surface, the sloping surface terminating at one end in a cutting edge and intersecting at its other end the upper surface and defining at said intersection a knife alignment edge;
    an adjustable clamp having a plurality of bolt holes therethrough, the bolt holes greater in diameter than bolts which will pass through the clamp such that the clamp may be moved with reference to the rotor seat within the limits defined by the diameters of the bolt holes, the clamp including a forward portion, the forward portion comprising an upper sloped surface and a lower flat surface, the lower flat surface engaging the upper surface of the knife, the upper sloped surface defining with the lower flat surface a clamp alignment edge;
    a plurality of bolts adapted to pass through the holes in the clamp to secure the clamp to the rotor seat such that the sloped surface of the clamp and the sloped surface of the knife are in substantially the same plane and the alignment edge of the knife and the alignment edge of the clamp are substantially adjacent to one another to provide maximum support to the clamped knife.

2. The granulator of claim 1 which includes:
    means to adjust the position of the clamp with reference to the rotor seat.

3. The granulator of claim 2 wherein the means to adjust includes a gauge.

4. The granulator of claim 1 wherein each of the bolt holes is characterized by a stepped surface, the stepped surface defining upper larger holes and lower smaller holes, the diameters of the smaller holes defining the limits within which the clamp may be adjusted.

* * * * *